May 14, 1968  H. ROGGATZ  3,382,730

CHAIN GUIDE

Filed April 29, 1966

INVENTOR
HANS ROGGATZ 3,382,730
CHAIN GUIDE
Hans Roggatz, Wetter (Ruhr), Germany, assignor to
Demag-Zug G.m.b.H., Wetter (Ruhr), Germany
Filed Apr. 29, 1966, Ser. No. 546,367
Claims priority, application Germany, Sept. 24, 1965,
D 48,270
2 Claims. (Cl. 74—240)

ABSTRACT OF THE DISCLOSURE

A combination chain guide and link chain includes a link chain having substantially ellipsoidal links which are of a length greater than width thereof. The guide includes four vertically extending guide grooves arranged in substantially right angle angular relationship with opposed sets of the grooves being dimensioned from the bottom of one to the bottom of the opposite one of an amount less than the length of the links but sufficiently wide to accommodate the width of the links. In addition the guide includes walls formed at the entrance to the grooves which converge inwardly to the grooves so that any link which is fed with its long side transverse to the feed direction will be deflected so that it will enter into the guide grooves with its width transverse so that it can be satisfactorily accommodated.

General description of the invention

Figure 1:
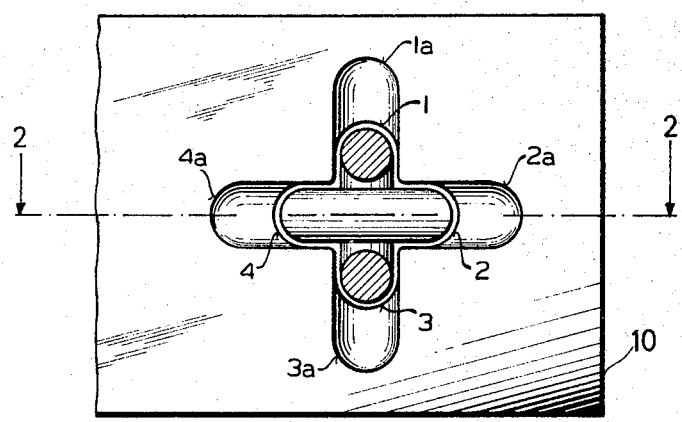

This invention relates in general to the construction of chain guides, and in particular to a new and useful chain guide which is arranged for vertical guiding of a link chain used particularly for electric trains and constructed to provide a straightening action on the links which are drawn therethrough.

The present invention is particularly useful for electric trains having a chain-type lifting member which enters a guide vertically. In such hoist, the chain is received in an open chain storage. In dusty operations the greased chain therefore becomes dirty very easily. There is thus a danger that the chain will enter the hoist or the chain guide in a twisted form from the chain storage location. With known chain guides this would cause serious damage to the guides so that the mechanism would even become inoperable.

In accordance with the present invention there is provided a chain guide having guide grooves which intersect centrally at substantially right angles, the grooves being of a length to accommodate between opposed grooves the width of the links of the chain. The guide also includes widened aligning groove portions at the location of the incoming feed of the chain of a length to accommodate the length of the chain links. The construction is such that the individual links are guided by the aligning grooves into correct orientation, i.e., with their longitudinal axes substantially aligned as they are fed into the guide grooves.

The entrance aligning grooves are formed with oblique surfaces so that any link which is oriented with its longitudinal axis extending crossways will be deflected by the walls of the entrance aligning groove portions until it assumes a position with its longitudinal axis aligned for entry into the guide grooves of the guide element.

Accordingly, it is an object of the invention to provide an improved chain guiding member of simple construction which includes means for straightening the links of the chain which is fed thereto.

A further object of the invention is to provide a guide for chains which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 2:
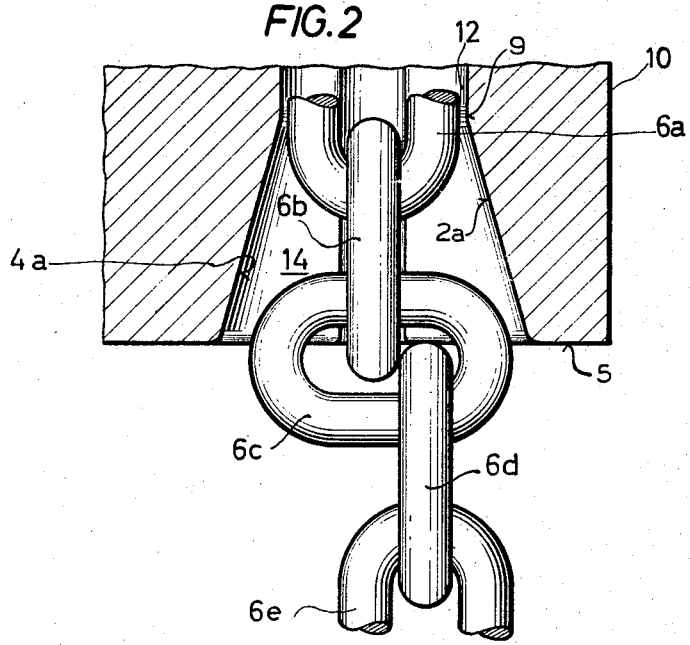

In the drawings:

FIG. 1 is a partial bottom plan view and cross sectional view of a chain guide and chain constructed in accordance with the invention; and FIG. 2 is a partial vertical sectional view taken on the line 2—2 of FIG. 1.

Referring to the drawings in particular, the invention embodied therein comprises the chain guiding device or member generally designated 10 which includes an upper chain guide portion formed with intersecting cross groove portions 1 and 3 and 2 and 4. The combined grooves 1 and 3 and the combined grooves 2 and 4 have an extent comparable to the width of each chain link 6a, 6b, 6c, 6d, etc. Chains which enter the upper portion 12 and into either the guide grooves 1–3 or the guide grooves 2–4 must be oriented with the longitudinal axes aligned or extending substantially vertically in the embodiment illustrated. If the axes are not aligned the chain links will not pass through the guide grooves 1, 3 or 2, 4.

In accordance with the invention, means are provided for straightening the links of the chain as they pass through an intermediate straightening section 14 of the chain guiding device 10. In this intermediate section 14, the grooves 1, 3 and 2, 4 are widened downwardly and obliquely or are joined by aligning grooves 1a, 2a, 3a and 4a.

Thus, it can be seen that the link 6a which has already been moved downwardly beyond the guiding and straightening section 14 will enter the grooves 2 and 4 in the guiding section 12. The link 6b which is next in line has already been indicated in an orientation with its longitudinal axis extending substantially vertically and it is in position for moving into the opposed aligned grooves 1 and 3.

The chain link 6c, however, is indicated with its longitudinal axis extending substantially horizontally and it would not be possible for it to enter into the next set of grooves 2 and 4 after the link 6b has moved upwardly unless it is first realigned. The oblique surfaces 2a and 4a, however, provide aligning means which insure that the link 6c will be pivoted and moved until its axis does lie substantially vertically or in line with axes of the previously fed links.

The depressions or guiding grooves 1a, 2a, 3a and 4a terminate at the location 9 without a step, that is, they terminate at a level at which the link 6c will already be straight.

While a specific embodiment of the invention has been shown and described in detail to illustrate the application of the inventive principles, it will be understood that the invention may be embodied otherwise without departing from such principles.

What is claimed is:

1. A combination chain guide, and a chain movable in said guide, said chain having substantially ellipsoidal interlocked links of a length greater than the width thereof, said guide member having four elongated guide grooves arranged in substantially right angular opposed pair relationship with opposed pairs of said guide grooves being dimensioned from the bottom of one groove to the bottom of the opposite groove less than the length of said links and sufficient to accommodate the width of a chain link, said guide member also having straightening walls formed as outward extensions of said guide grooves being of a dimension at their outer ends to accommodate the length of a chain link therebetween and converging inwardly to said guide grooves for deflecting links initially arranged lengthwise and transverse to said guide grooves to a position at which their width portions are aligned with said guide groove before they are received in said guide grooves.

2. A combination chain guide, and a chain according to claim 1, wherein said straightening walls include an obliquely extending groove aligned with each of said guide grooves.

References Cited

UNITED STATES PATENTS

| | | | |
|---|---|---|---|
| 1,194,133 | 8/1916 | Brown | 74—240 |
| 2,101,685 | 12/1937 | Nisbet | 74—240 XR |
| 2,737,823 | 3/1956 | Smallegan | 74—240 |
| 2,830,808 | 4/1958 | Graber | 254—190 XR |
| 2,881,904 | 4/1959 | Hoerth. | |

FOREIGN PATENTS 932,772  9/1955  Germany.

FRED C. MATTERN, JR., *Primary Examiner.*

J. A. WONG, *Assistant Examiner.*